US007089069B2

(12) United States Patent

Gabriel et al.

(10) Patent No.: US 7,089,069 B2

(45) Date of Patent: Aug. 8, 2006

(54) METHOD AND APPARATUS FOR RECONSTRUCTION OF SOUNDWAVES FROM DIGITAL SIGNALS

(75) Inventors: Kaigham Gabriel, Pittsburgh, PA (US); John J. Neumann, Jr., Pittsburgh, PA (US); Brett M. Diamond, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 10/222,242

(22) Filed: Aug. 16, 2002

(65) Prior Publication Data

US 2003/0044029 A1 Mar. 6, 2003

Related U.S. Application Data

(60) Provisional application No. 60/313,379, filed on Aug. 17, 2001.

(51) Int. Cl.
*G06F 17/00* (2006.01)
*H04R 3/00* (2006.01)

(52) U.S. Cl. ........................ 700/94; 381/117; 310/320; 310/331

(58) Field of Classification Search .................. 700/94; 381/111, 117, 116; 310/331, 334, 320, 322, 310/324, 328
See application file for complete search history.

(56) References Cited

U.S. PATENT DOCUMENTS 4,515,997 A 5/1985 Stinger, Jr.
4,555,797 A 11/1985 Nieuwendijk et al.
5,357,807 A * 10/1994 Guckel et al. ................ 73/721
5,569,968 A * 10/1996 Lal et al. .................... 310/322
5,658,710 A 8/1997 Neukermans
5,717,631 A 2/1998 Carley et al.
5,774,252 A 6/1998 Lin et al.
5,808,781 A 9/1998 Arney et al.
5,867,302 A 2/1999 Fleming
5,876,187 A 3/1999 Afromowitz et al.
5,970,315 A 10/1999 Carley et al.

(Continued)

FOREIGN PATENT DOCUMENTS

EP 0 911 952 A2 4/1999

(Continued)

OTHER PUBLICATIONS

Clarke, Peter, "English startup claims breakthrough in digital loudspeakers", EETimes online, posted at http://www.eetimes.com/news/98/1017news/english.html on Jul. 13, 1998, pp. 1-5.

(Continued)

*Primary Examiner*—Xu Mei
(74) *Attorney, Agent, or Firm*—Edward L. Pencoske

(57) ABSTRACT

Each of a plurality of speaklets (MEMS membranes) produces a stream of clicks (discrete pulses of acoustic energy) that are summed to generate the desired soundwave. The speaklets are selected to be energized based on the value of a digital signal. The greater the significance of the bit of the digital signal, the more speaklets that are energized in response to that bit. Thus, a time-varying sound level is generated by time-varying the number of speaklets emitting clicks. Louder sound is generated by increasing the number of speaklets emitting clicks. The present invention represents a substantial advance over the prior art in that sound is generated directly from a digital signal without the need to convert the digital signal first to an analog signal for driving a diaphragm.

22 Claims, 6 Drawing Sheets

U.S. PATENT DOCUMENTS

| | | | | |
|---|---|---|---|---|
| 6,028,331 | A | 2/2000 | Mastromatteo et al. | |
| 6,128,961 | A | 10/2000 | Haronian | |
| 6,249,075 | B1 * | 6/2001 | Bishop et al. | 310/338 |
| 6,262,946 | B1 * | 7/2001 | Khuri-Yakub et al. | 367/181 |
| 6,373,682 | B1 * | 4/2002 | Goodwin-Johansson | 361/278 |
| 6,492,761 | B1 * | 12/2002 | Perez | 310/324 |
| 6,552,469 | B1 * | 4/2003 | Pederson et al. | 310/309 |
| 6,829,131 | B1 * | 12/2004 | Loeb et al. | 361/234 |
| 6,859,577 | B1 * | 2/2005 | Lin | 385/18 |
| 6,933,873 | B1 * | 8/2005 | Horsley et al. | 341/148 |
| 6,936,524 | B1 * | 8/2005 | Zhu et al. | 438/459 |
| 2002/0017834 | A1 * | 2/2002 | MacDonald | 310/328 |

FOREIGN PATENT DOCUMENTS

| | | | | |
|---|---|---|---|---|
| EP | 1063866 | A1 | | 12/2000 |
| GB | 2373956 | A | * | 10/2002 |
| JP | 58121897 | | | 7/1983 |
| WO | WO 93/19343 | | | 9/1993 |
| WO | WO 94/30030 | | | 12/1994 |
| WO | WO 0120948 | A2 | | 3/2001 |

OTHER PUBLICATIONS

Iverson, Jon, "New Digital Loudspeaker Technology Announced from England", Stereophile News, posted at http://www.stereophile.com/shownews.cgi?234 on Aug. 10, 1998, pp. 1-2.

Iverson, Jon, "Just What Is a Digital Loudspeaker?", Stereophile News, posted at http://www.stereophile.com/shownews.cgi?235 on Aug. 10, 1998, pp. 1-3.

Neumann, Jr., John J. and Gabriel, Kaigham J., CMOS-MEMS Membrane for a Audio-Frequency Acoustic Actuation, Electrical and Computer Engineering.

Department, Carnegie Mellon University, 2001, pp. 236-239.

Diamond, Brett M., Neumann, Jr., John J. and Gabriel, Kaigham J., Digital Sound Reconstruction Using Arrays of CMOS-MEMS Microspeakers, MEMS Labroatory.

* cited by examiner

METHOD AND APPARATUS FOR RECONSTRUCTION OF SOUNDWAVES FROM DIGITAL SIGNALS

CROSS-REFERENCE TO RELATED APPLICATIONS

The present invention claims priority based on U.S. Provisional Patent Application, Ser. No. 60/313,379 filed Aug. 17, 2001 entitled "DIRECT DIGITAL EARPHONES", which is hereby incorporated by reference.

FIELD OF THE INVENTION

The present invention relates generally to the generation of a sound waveform directly from a digital signal and, more particularly, to the digital reconstruction of a sound waveform by providing a digital signal directly to microelectromechanical system (MEMS) devices.

BACKGROUND

Typical audio speakers use a vibrating diaphragm to produce soundwaves. The diaphragm is usually connected to a voice coil (i.e., an electromagnet). The voice coil is placed within the magnetic field of a permanent magnet. When an analog electrical signal is applied to the voice coil, the voice coil is either attracted to or repulse by the permanent magnet, depending on the polarity of the analog electrical signal. The analog electrical signal's alternating polarity imparts motion to the attached diaphragm, thus creating a soundwave. By varying the strength and the time it takes the analog electrical signal to change polarity, the volume and frequency, respectively, of the soundwave produced is regulated.

Most of today's sound recordings (for example, music, movies, etc.) are digitally recorded on, for example, CD's, DVD's, etc. Typical audio speakers, however, require that the digital sound recording be converted into an analog signal to drive the audio speaker's voice coil. Thus, additional digital-to-analog circuitry must be provided in the driver device (e.g., CD player, DVD player, etc.). The additional circuitry increases the complexity, size, cost, and power consumption of the driver device.

Thus, a need exists for a method and apparatus for directly reconstructing sound with a digital signal (i.e., without the need for converting the digital signal to an analog signal).

SUMMARY

The present invention is directed to the generation of sound by the super position of discrete digital sound pulses from arrays of micromachined membranes called speaklets. The digital sound reconstruction (DSR) of the present invention is unlike any other reconstruction approach that has been demonstrated in that it offers true, digital reconstruction of sound directly from the digital signal. Traditional sound reconstruction techniques use a single to a few analog speaker diaphragms with motions that are proportional to the sound being created. In DSR, each speaklet produces a stream of clicks (discrete pulses of acoustic energy) that are summed to generate the desired sound waveform. With DSR, louder sound is not generated by greater motion of a diaphragm, but rather by a greater number of speaklets emitting clicks. Summarily, the time-varying sound level is not generated by a time-varying diaphragm motion, but rather by time-varying numbers of speaklets emitting clicks.

The present invention represents a substantial advance over the prior art in that sound is generated directly from a digital signal without the need to convert the digital signal first to an analog signal for driving a diaphragm. The elimination of the digital to analog circuitry reduces cost and nonlinearities resulting from such electronics. Furthermore, in the preferred method, the speaklets are produced using CMOS process techniques, which are well known and widely available. As a result, the speaklets can be produced in a uniform, cost effective manner. Those advantages and benefits, and others, will be apparent from the Detailed Description appearing below.

BRIEF DESCRIPTION OF THE DRAWINGS

To enable the present invention to be easily understood and readily practiced, the present invention will now be described for purposes of illustration and not limitation, in connection with the following figures wherein.

FIG's 5A–5C illustrates oscilloscope traces comparing the digital, acoustic reconstruction of a 500 Hz signal using a 1-bit, 2-bit, and 3-bit quantization, respectively.

Figure 6:
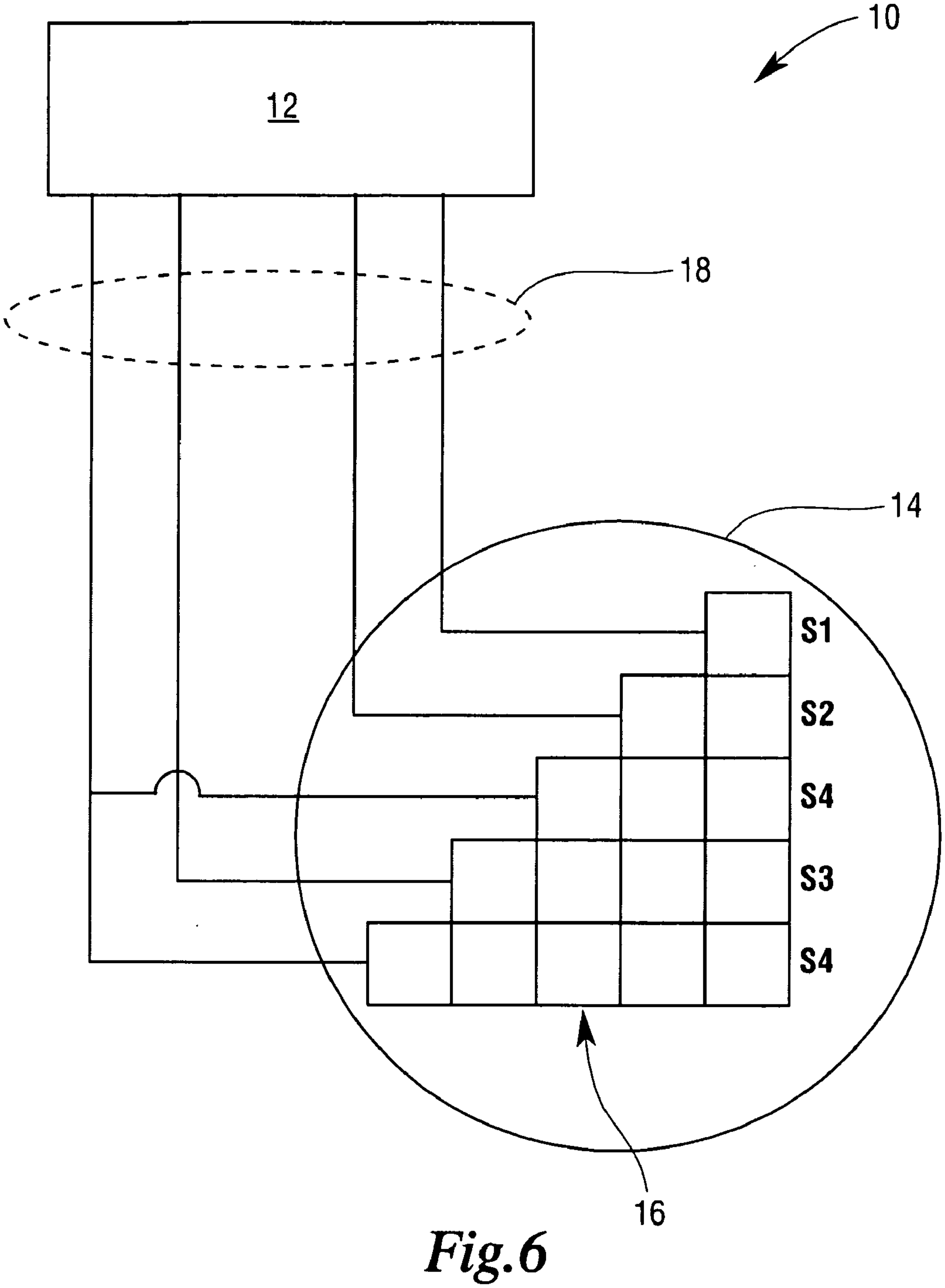

FIG. 6 illustrates an embodiment of the present invention in which the number of speaklets activated is responsive to the position of each bit in a digital signal.

Figure 7:
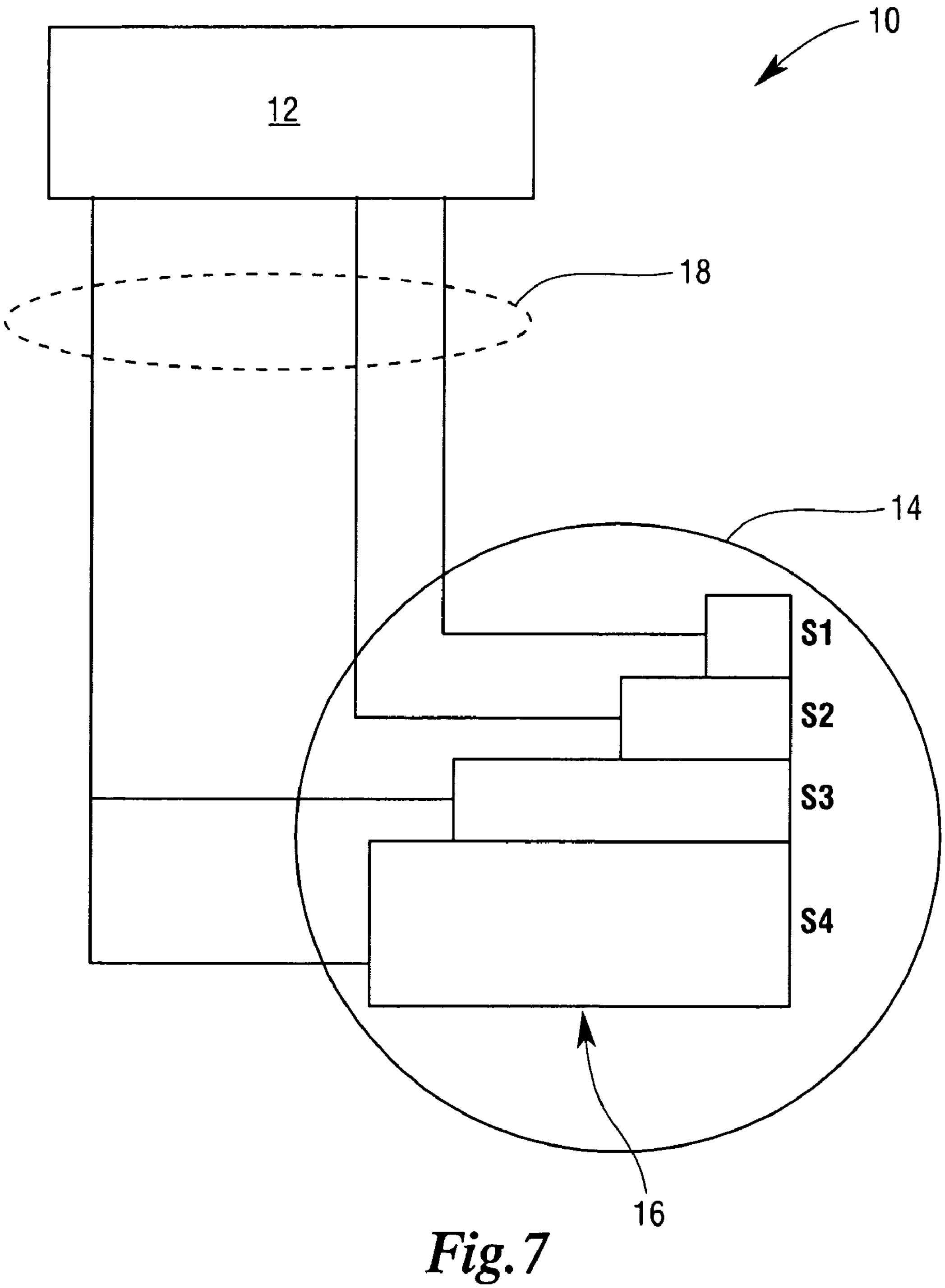
Figure 8:
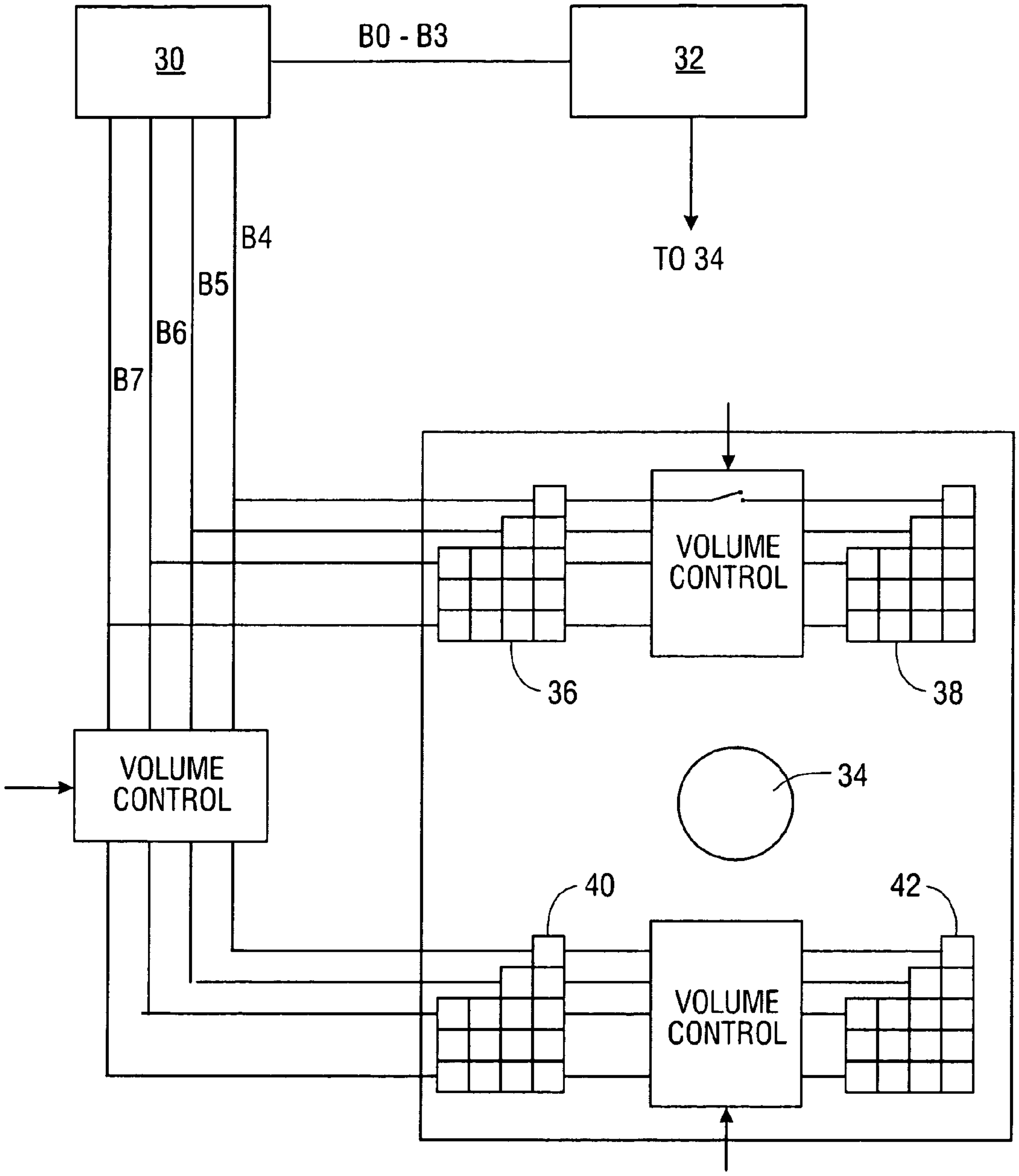

FIG. 7 illustrates an embodiment of the present invention in which the position of each bit in a digital signal determines which speaklet (of different sized speaklets) is to be activated, and FIG. 8 illustrates a hybrid implementation in which certain parts of the digital signal are reproduced with a traditional speaker while other parts of the digital signal are reproduced with the apparatus of the present invention.

DETAILED DESCRIPTION

Figure 1A:
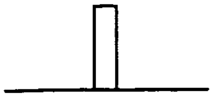
FIGS. 1A, 1B and 1C illustrate an idealized sound pulse (click) generated by a single speaklet's binary motion, a top view of an array at three different points in time, and a soundwave generated by the array, respectively.
Figure 1B:
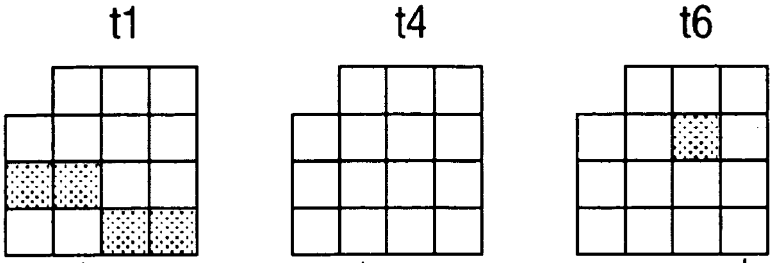
Figure 1C:
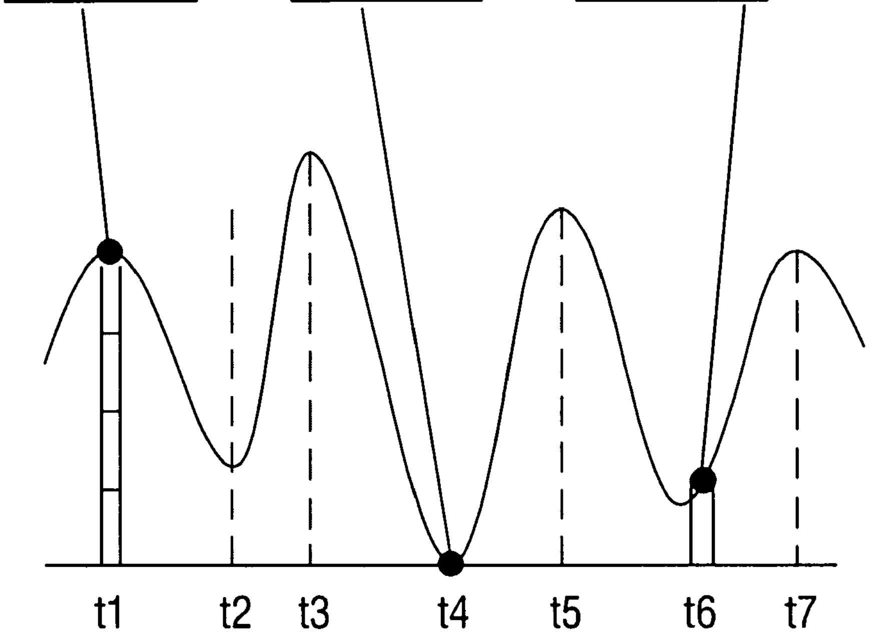

FIG. 1A illustrates an idealized sound pulse (click) generated by a single speaklet's binary motion. FIG. 1B is a top view of an array at three different points in time, i.e., as time t1, time t4, and time t6. At time t1, four speaklets have been activated. At time t4, no speaklets have been activated while at time t6 one speaklet has been activated. FIG. 1C illustrates how the clicks of FIG. 1A produced by the array of FIG. 1B are additive. Thus, the soundwave illustrated in FIG. 1C has a magnitude at time t1 equal to that of four clicks while the soundwave produced at time t4 has a magnitude of zero corresponding to the production of no clicks. The soundwave produced in FIG. 1C is produced directly from a digital signal. For example, the digital signal at time t1 has a value of "1 0", at time t4 a value of "0 0" and at time t6 a value of "0 1". Those values of the digital signal are used to directly drive speaklets without the need to convert the signal first into an analog signal. The digital sound reconstruction (DSR) of the present invention is unlike any other reconstruction approach in that the digital signal is used to directly drive speaklets, producing clicks, which are summed to produce the output waveform. In DSR, each speaklet produces a stream of clicks to generate the desired soundwave. Thus, louder sound is not generated by greater motion of diaphragms, but rather by a greater number of speaklets emitting clicks. Similarly, the time varying sound level is not generated by a time-varying diaphragm motion, but rather by the time-varying numbers of speaklets emitting clicks.

In the current embodiment, the individual speaklets 16 are fabricated using CMOS-based processes as disclosed, for example, in International Publication No. WO 01/20948 A2 published Mar. 22, 2001 and entitled "MEMS Digital-to-Acoustic Transducer with Error Cancellation", which is hereby incorporated by reference, although other methods of producing membranes may be used. For example, a serpentine metal and oxide mesh pattern (1.6 μm-wide beams and gaps) is repeated to form meshes with dimensions up to several millimeters. The mesh patterns are formed in a CMOS chip, etched, and released to form a suspended mesh, typically 10–50 μm above the substrate. A Teflon™-like conformal polymer (0.5–1 μm) is then deposited onto the chip, covering the mesh and forming a membrane having an airtight seal over a cavity. Depending on the mesh geometry and gap between the membrane and substrate, a 50–90 volt potential is applied to electrostatically actuate the membrane. Ventilation holes are etched from the back, allowing greater movement of the membrane by decreasing the acoustic impedance on the membrane's backside and providing a mechanism for damping resonant oscillations. Each membrane forms a speaklet.

Figure 2:
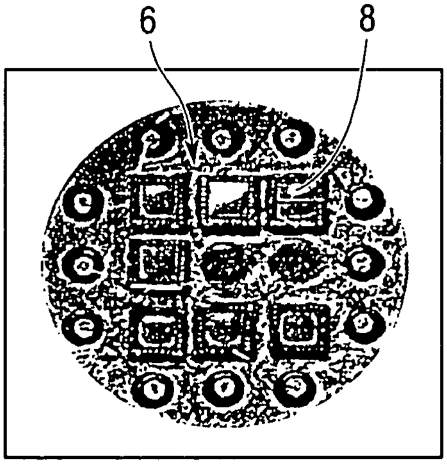
FIG. 2 is a photograph of a 3-bit (7 speaklet) DSR earphone assembled and bonded in a TO-8 package. Under the chips, ventilation holes have been drilled through the package. Unused holes are filled to prevent air leakage.
Figure 3A:
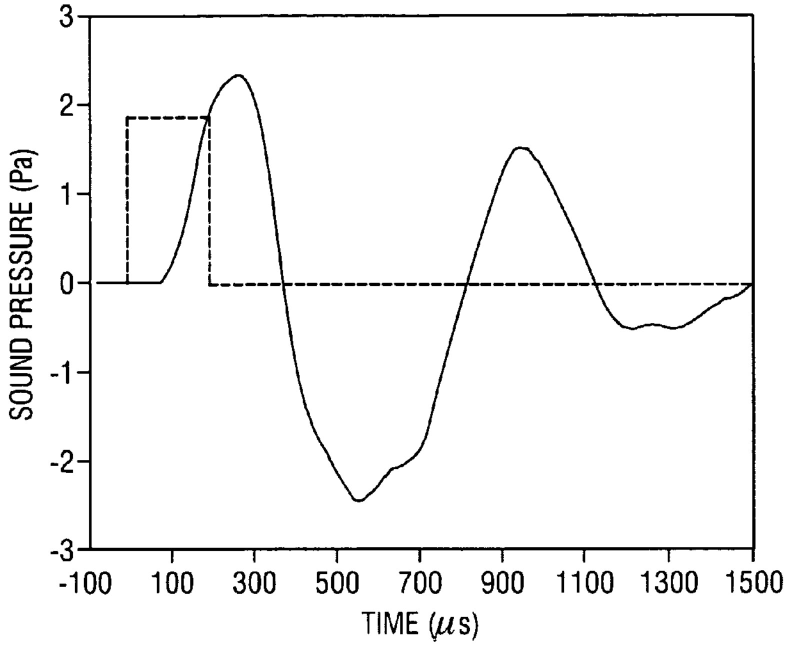
FIG. 3A illustrates a 200 μs long, 90 volt input pulse and the resulting response from one speaklet of FIG. 2.
Figure 3B:
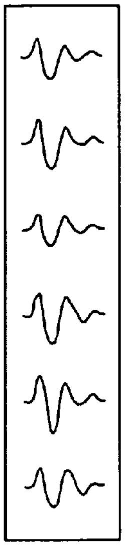
FIG. 3B are curves illustrating the responses of the six other speaklets of FIG. 2 from the same pulse.

Test data for the present invention was obtained using an array 6 of seven speaklets 8 as shown in FIG. 2. The speaklets 8 measured 1.4 mm×1.4 mm and were bonded to a TO-8 electronic package to construct a 3-bit digital earphone. Four of the seven speaklets 8 were electrically tied to the same input to form the most significant bit of sound, two speaklets 8 were tied to form the next most significant sound bit, and the remaining speaklet 8 formed the least significant bit. The earphone was connected to a Brtüel and Kjaer (B&K) 4157 ear simulator and the earphone-microphone pair was put inside a B&K 4232 anechoic test chamber. FIG. 3A is a curve illustrating a 200 μsec long, 90 Volt input pulse and the acoustic output response of one speaklet 8 of FIG. 2. The responses of the other six speaklets 8 are shown in FIG. 3B and are similar to that illustrated in FIG. 3A, the shape and amplitude of each differed slightly due to process variations across separate chips.

Figure 4:
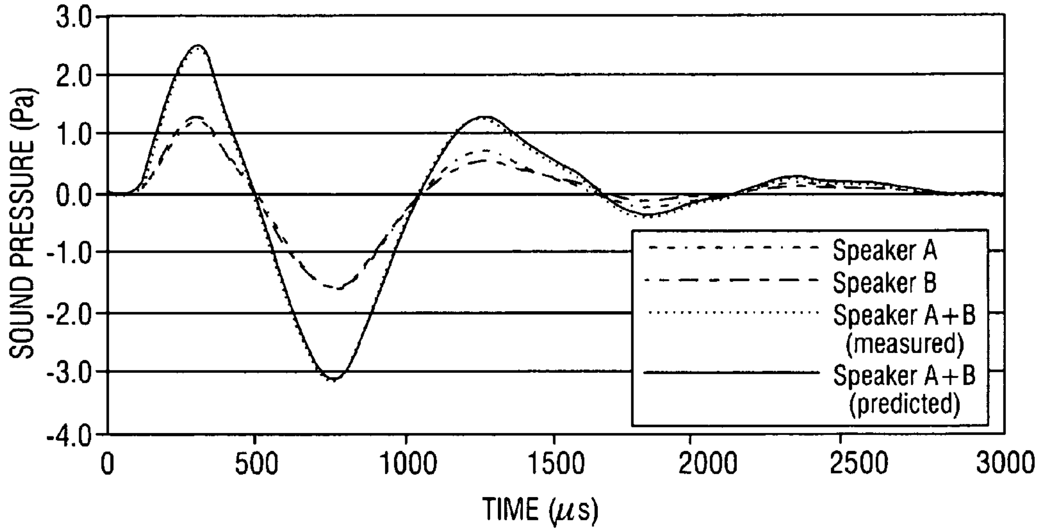
FIG. 4 illustrates the acoustic response of two individual speaklets and the additive response of both speaklets. The measured response is within 3% of the predicted additive response (mathematical sum of both speaklet responses).
Figure 5A:
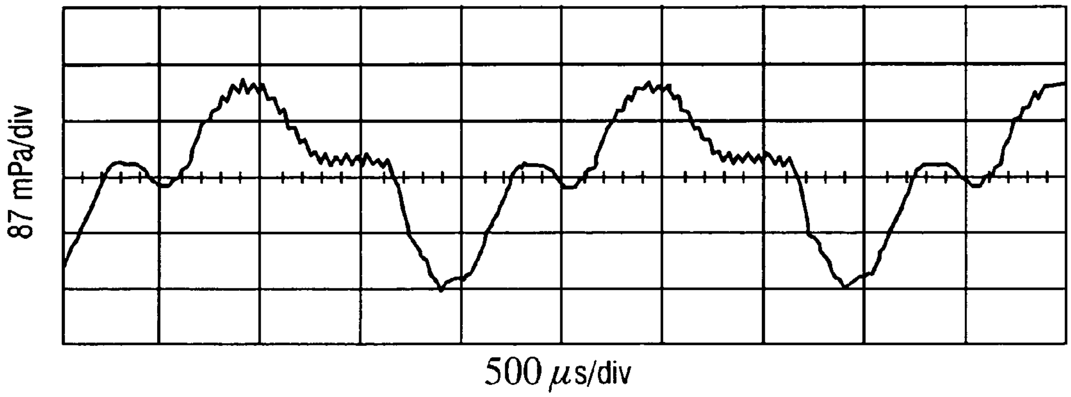
Figure 5B:
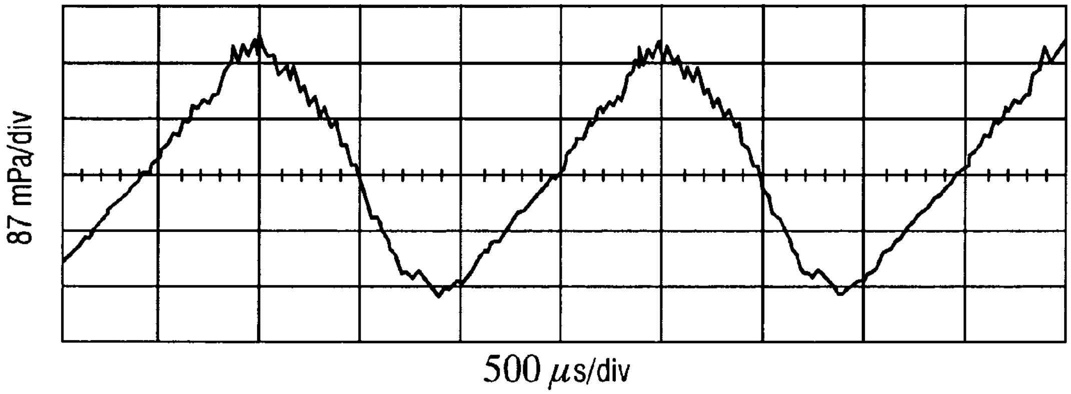
Figure 5C:
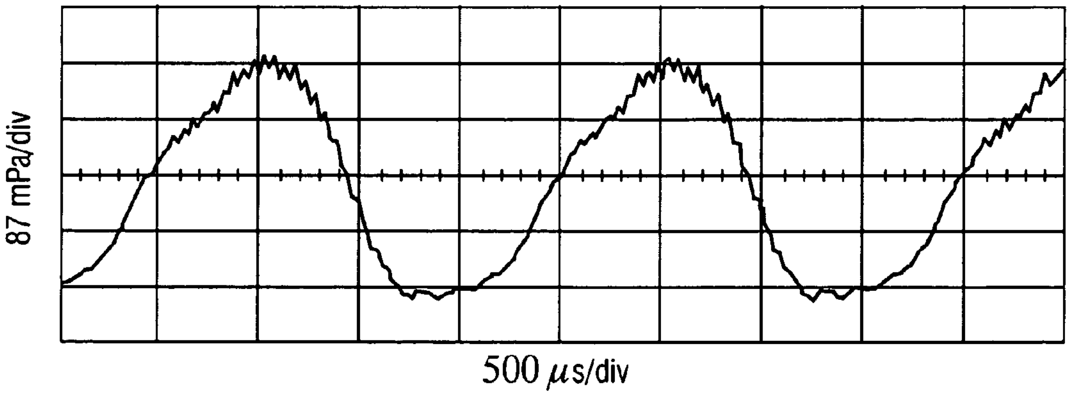

To demonstrate the additive nature of the acoustic responses, we measured the individual responses from a 200 μsec 90 volt pulse for two speaklets. Then we drove both speaklets simultaneously with the same pulse and measured the collective response. As seen in FIG. 4, the measured collective response matches the predicted response within 3% at any point along the waveform.

FIG's 5A–5C illustrate oscilloscope traces that measure the response of the device of FIG. 2 using a 1-bit, 2-bit and 3-bit quantization, respectively, of a 500 Hz sinusoid. The digital samples were regenerated at 20,000 samples/second using Labview 5.1 and a NI-6713 Data Acquisition (DAQ) card.

FIG. 6 is a simplified view of a digitally driven system 10 according to an embodiment of the present invention. The digitally driven system 10 is comprised of drive electronics 12 and an array 14 of speaklets 16. In the current embodiment, the speaklets 16 are microelectro mechanical system (MEMS) membranes. The array 14 is electrically connected to the drive electronics 12 via one or more leads 18.

Drive electronics 12 are operable to directly drive the speaklets 16 with a digital signal. The drive electronics 12 may, for example, be contained within a CD player, DVD player, MP3 player, etc. In the current embodiment, the digital signal is a multi-bit signal. For simplification (and not as a limitation), a 4-bit digital signal is used to illustrate the present invention in the current embodiment. It should be noted that digital signals having a different number of bits may be used (for example, 3-bit, 8-bit, 16-bit, 32-bit, etc.) while remaining within the scope of the present invention. It should be further noted that the term "directly drive" refers to activating a speaklet 16 without first converting the digital signal to an analog signal. Thus, in the current embodiment, digital-to-analog converters are not required.

In the embodiment of FIG. 6, array 14 is divided into four subsets (e.g., S1, S2, S3, S4). Each subset corresponds to one bit of the 4-bit signal. Each subset is comprised of one or more speaklets 16. More specifically, as illustrated in FIG. 6, subsets S1, S2, S3, and S4 are comprised of one, two, four, and eight speaklets 16, respectively. As illustrated, subset S4 represents the most significant bit of the 4-bit signal and subset S1 represents the least significant bit of the 4-bit signal. Drive electronics 12 are responsible for producing drive pulses for causing speaklets 16 to be driven from their at rest position to their driven position whenever a "1" appears in the digital signal at the position associated with that set. The drive pulses therefore control the position of the membranes. For example, for the signal "0100" the speaklets of subset S3 are activated; for the signal "0110" the speaklets of subset S3, after returning to their at rest positions, are activated again along with the speaklets of subset S2. In that manner, a soundwave is directly reconstructed from the digital sound.

FIG. 7 illustrates an embodiment of the present invention in which the position of each bit in a digital signal determines which speaklet, from among a plurality of different sized speaklets, is to be activated. In FIG. 7, the speaklet corresponding to subset S2 is twice as large as the speaklet corresponding to subset S1. Similarly, the speaklet corresponding to subset S3 is twice as large as the speaklet for subset S2 and the speaklet corresponding to subset S4 is twice as large as the speaklet corresponding to subset S3. In such an embodiment, the signal "0100" would cause the speaklet S3 to be activated while the signal "0110" would cause the speaklet of subset S3, after returning to its rest position, to be activated again along with the speaklet corresponding to subset S2. Those of ordinary skill in the art will recognize that the embodiments of FIG. 6 and FIG. 7 may be combined. For example, the speaklet in FIG. 7 corresponding to subset S4 could be replaced with eight speaklets the size of the speaklet corresponding to subset S1 while leaving the size of the speaklets corresponding to subsets S1, S2 and S3 unchanged. Another example is for the speaklet of subset S3 to be comprised of two speaklets of the size of subset S2. In such an embodiment, the speaklet corresponding to subset S4 could be comprised of four speaklets of the size of the speaklet comprising subset S2. A wide variety of combinations can be obtained depending upon the process being used and limitations imposed by the layout. However, the effective sound producing area, resulting either from increased numbers of speaklets or speaklets of increased size for each set, except the set representative of the least significant bit, is twice that of the set representative of the preceding bit. For example, the set of speaklets for bit B1 is twice the number, or twice the size, of the set of speaklets for bit B0; the set of speaklets for bit B2 is twice the number, or twice the size, or some combination thereof, of the set of speaklets for bit B1, etc.

FIG. 8 illustrates yet another embodiment of the present invention. In FIG. 8, drive electronics 30 provide the four least significant bits, bits B0–B3, to a digital-to-analog converter 32 which is used to drive a conventional speaker 34. The remainder of the digital signal, the most significant bits B4–B7, is used to drive arrays 36, 38, 40 and 42 which may be of the type illustrated in FIG. 6 or the type illustrated in FIG. 7, although the number of speaklets has been reduced for purposes of illustration. For example B4 could drive sixteen speaklets, B5 thirty-two speaklets, etc. The number of arrays, one, two, three or four, that are fired in response to the most significant bits is a function of the volume setting. For example, the higher the volume, the more arrays that are fired in response to the most significant bits.

The apparatus of the present invention can be manufactured using mass-produceable, micromachining technology to create the array of speaklets having characteristics that are extremely uniform from one speaklet to the next. Furthermore, the mechanical speaklets can be integrated with the necessary signal processing, addressing and drive electronics as such signal processing, addressing and drive electronics may be manufactured using the same CMOS techniques used to manufacture the speaklets. Use of MEMS fabrication technology allows for low-cost manufacturing; the utilization of a multitude of identical speaklets provides linearity as the speaklets are as close to being identical as possible within the tolerances of the lithographic processes used. Another advantage of the present invention is the extremely flat frequency response due to the fact that the resonant frequencies of the speaklets are far above the audio range. Because of the close physical location of the speaklets, their individual contributions are summed through the addition of the soundwaves they produce.

The division of labor amongst speaklets does not correspond to frequency range as in the case of a woofer, midrange, tweeter set-up. Rather, the number of speaklets that are activated is proportional to the desired sound pressure and not the frequency to be produced. Off-axis changes in frequency response due to interference effects are believed to be minimal in an earphone design utilizing the present invention because the acoustic pathlength differences are smaller than the shortest soundwave lengths of interest. Another advantage of an earphone constructed using the present invention is the extremely small sound pressures needed for normal use. Use of CMOS process technology allows the production of an earphone having small feature size thereby providing geometry control and registration of the device within an ear canal.

It should be recognized that the above-described embodiments of the invention are intended to be illustrative only. Numerous alternative embodiments may be devised by those skilled in the art without departing from the scope of the following claims. For example, in an alternative embodiment, an array having 256 speaklets (e.g. for an 8-bit DSR) may be used, and additional arrays provided for increased volume. The size of the speaklets' membranes may also be reduced to minimize ringing and lower the drive voltages necessary to actuate the speaklets. Additionally, arrays may be fabricated on a single chip to reduce process variations and improve response uniformity.

What is claimed is:

1. A method of reconstructing a waveform from a multi-bit digital signal, comprising:

using at least certain bits of a multi-bit digital signal to drive a plurality of sealed, micromachined mesh, membranes suspended above a substrate.

2. The method of claim 1 additionally comprising organizing said plurality of membranes into groups in which each group is representative of one bit of the digital signal.

3. The method of claim 2 wherein each group of membranes, except the group representative of the least significant bit, has twice the number of membranes as the group representative of the preceding bit of the digital signal.

4. The method of claim 2 wherein each group consists of at least one membrane and wherein each membrane, except the membrane representative of the least significant bit, has twice the area of the membrane representative of the preceding bit of the digital signal.

5. The method of claim 2 wherein each group, except the group representative of the least significant bit, has twice the effective area as the group representative of the preceding bit of the digital signal.

6. A method of directly constructing a waveform from a multi-bit digital signal, comprising:

inputting at least certain bits to drive electronics to produce drive pulses;

controlling the position of a plurality of sealed, micromachined mesh, membranes suspended above a substrate with said drive pulses.

7. The method of claim 6 additionally comprising organizing said plurality of membranes into groups in which each group is representative of one bit of the digital signal.

8. The method of claim 7 wherein each group of membranes, except the group representative of the least significant bit, has twice the number of membranes as the group representative of the preceding bit of the digital signal.

9. The method of claim 7 wherein said each group consists of at least one membrane and wherein each membrane, except the membrane representative of the least significant bit, has twice the area of the membrane representative of the preceding bit of the digital signal.

10. The method of claim 7 wherein each group, except the group representative of the least significant bit, has twice the effective area as the group representative of the preceding bit of the digital signal.

11. A method of producing a waveform from a digital signal, comprising:

generating a plurality of discrete acoustic energy pulses with a plurality of sealed, micromachined mesh, membranes suspended above a substrate.

12. The method of claim 11 additionally comprising organizing said plurality of sealed, micromachined mesh, membranes into groups in which each group is representative of one bit of the digital signal.

13. The method of claim 12 wherein each group of membranes except the group representative of the least significant bit has twice the number of membranes as the group representative of the preceding bit of the digital signal.

14. The method of claim 12 wherein each group consists of at least one membrane and wherein each membrane, except the membrane representative of the least significant bit, has twice the area of the membrane representative of the preceding bit of the multi-bit digital signal.

15. The method of claim 12 wherein each group, except the group representative of the least significant bit, has twice the effective area as the group representative of the preceding bit of the digital signal.

16. A digital sound reproduction apparatus, comprising:

a plurality of sealed, micromachined mesh, membranes suspended above a substrate;

a plurality of drivers for driving said plurality of membranes in response to a digital signal.

17. The apparatus of claim 16 wherein said membranes are organized into subsets, and wherein each of said plurality of drivers is responsive to a bit of a digital signal to drive one of said subsets, each of said subsets, except the subset representative of the least significant bit, has twice the effective area as the subset representative of the preceding bit.

18. The apparatus of claim 17 wherein the effective area is doubled by doubling the number of said membranes.

19. The apparatus of claim 17 wherein the effective area is doubled by doubling the size of said membranes.

20. The apparatus of claim 17 wherein the effective area is doubled by the combination of increasing the number and increasing the size of said membranes.

21. A device for producing an acoustic wave from a digital signal, comprising:

a plurality of drivers responsive to a digital signal for producing drive pulses representative of said digital signal; and a plurality of sealed, micromachined mesh, membranes suspended above a substrate and of substantially the same size responsive to said drive pulses.

22. A device for producing an acoustic wave from a digital signal, comprising:

a plurality of drivers responsive to a digital signal for producing drive pulses representative of said digital signal; and a plurality of sealed, micromachined mesh, membranes suspended above a substrate and of different sizes responsive to said drive pulses.

* * * * *

UNITED STATES PATENT AND TRADEMARK OFFICE

CERTIFICATE OF CORRECTION

PATENT NO. : 7,089,069 B2
APPLICATION NO. : 10/222242
DATED : August 8, 2006
INVENTOR(S) : Kaigham Gabriel et al.

It is certified that error appears in the above-identified patent and that said Letters Patent is hereby corrected as shown below:

Page 2, Column 2, last line, cancel “Labroatory” and substitute therefore --Laboratory, Electrical and Computer Engineering Department, Carnegie Mellon University, 2002, pages 292-295--.

Column 1, Line 28, delete “repulse” and substitute therefore --repulsed--.

Column 3, Line 44, delete “Brtüel” and substitute therefore --Brüel--.

Column 6, Line 29, after “pulses;” insert --and--.

Column 7, Line 9, after “substrate;” insert --and--.

Signed and Sealed this

Twenty-sixth Day of June, 2007

JON W. DUDAS
*Director of the United States Patent and Trademark Office*